A. H. BASTIAN.
TOOL FOR SETTING TEETH OF CROSSCUT SAWS.
APPLICATION FILED JULY 17, 1917.
1,285,592.  
Patented Nov. 26, 1918.
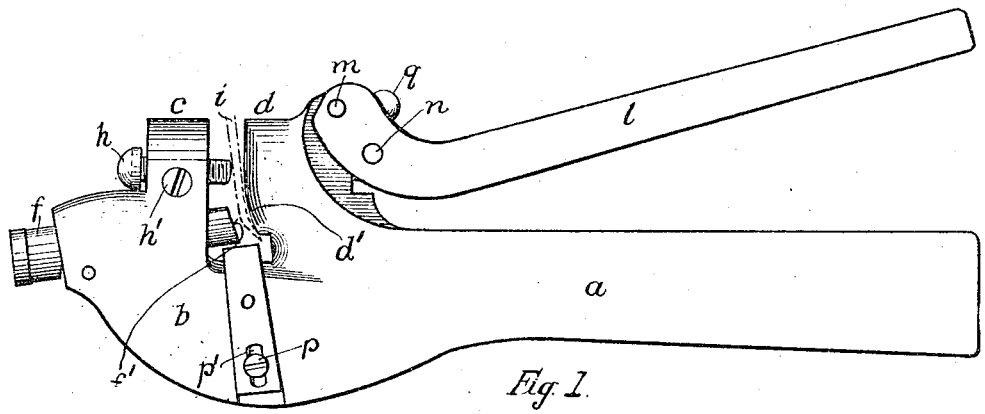
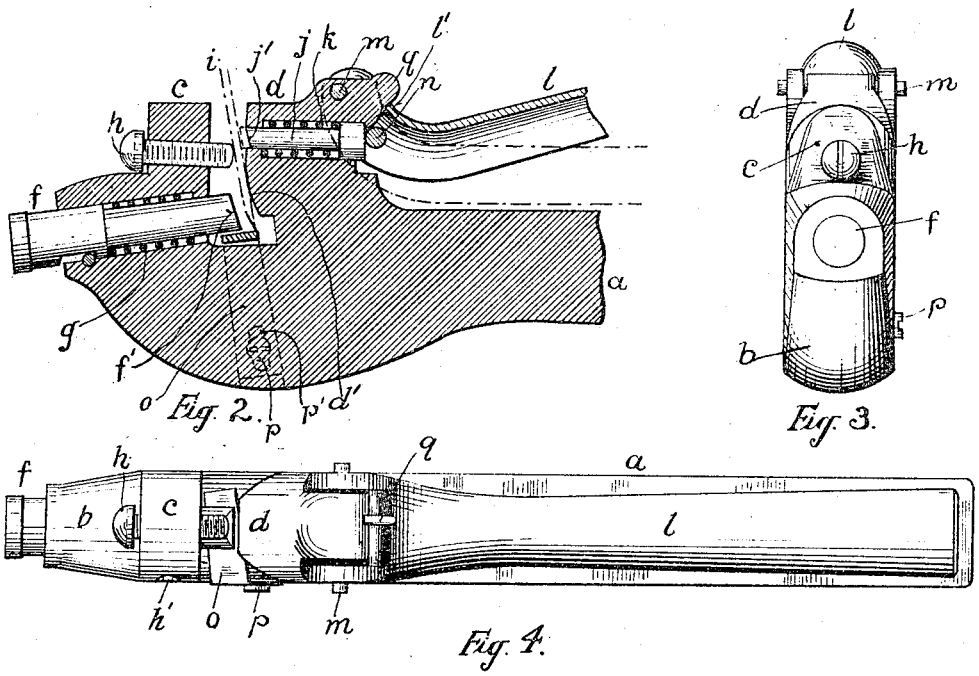
Inventor:  
August H. Bastian  
by  
Atty.

UNITED STATES PATENT OFFICE.

AUGUST H. BASTIAN, OF HILLSDALE, OREGON.

TOOL FOR SETTING TEETH OF CROSSCUT-SAWS.

1,285,592.

Specification of Letters Patent.

Patented Nov. 26, 1918.

Application filed July 17, 1917. Serial No. 181,156.

*To all whom it may concern:*

Be it known that I, AUGUST H. BASTIAN, a citizen of the United States, and a resident of Hillsdale, county of Multnomah, State of Oregon, have invented a certain new and useful Improvement in Tools for Setting Teeth of Crosscut-Saws, of which the following is a specification.

The object of my invention is to provide a tool for setting the teeth of a saw, especially a cross-cut saw, and to provide means in the tool for firmly clamping the same on the saw tooth to be set while holding the tool in place, so that during the operation of hammering the saw-point to its proper set the tool will not slip or shift; and in this way insuring that better work may be done, and all teeth of the saw be given a uniform set. My invention further has for its object the providing of an adjustable gage in the tool by which the proper location of the tip of the saw tooth may be determined relatively to the length of set to be given the point of the tooth. My invention further has for its object the providing of a compact, simple, durable, handy and effective tool for the purpose mentioned.

I attain my objects by the tool illustrated in the accompanying drawings, in which:

Figure 1 is a side elevation of my tool;

Fig. 2 is a partial, longitudinal section of same;

Fig. 3 is a top-end view of my tool; and

Fig. 4 is a top edge view of my tool, having reference to the position in which the same is shown in Fig. 1.

My tool comprises a shank, $a$, made with a head $b$ having opposed jaws $c$, $d$, leaving an intermediate space $e$ for inserting the tip of the saw tooth, as illustrated in Fig. 1. The face $d'$ of the lower jaw is shaped to the form of the set to be given the saw-tooth, and constitutes the anvil of my tool. In the upper jaw is reciprocably supported a striker $f$, held normally projected by a coil-spring $g$. The extremity of the striker is beveled, as shown at $f'$, so as to conform with the opposed face $d'$ of the lower jaw which serves as the anvil.

In order to clamp my tool firmly in place on the saw tooth, while setting the latter, the upper jaw is provided with a set-screw or gripping pin $h$, which may be adjusted so as to leave sufficient space to insert the saw tooth, as indicated by the dotted lines $i$, under it, and the set-screw $h'$ serves to secure the set-screw $h$ in place as adjusted.

The lower jaw $d$ is provided with a projectable gripping pin $j$, normally held retracted by a coil spring $k$. To forcibly project the gripping pin $j$, I provide a lever $l$, fulcrumed on a pin $m$, and provided with a cross-pin $n$ bearing against the head of the projectable gripping pin $j$. Thus when the lever $j$ is moved toward the shank $a$, as illustrated in dotted outlines in Fig. 2, the pin $j$ is projected. The stop $q$ limits the movement of the lever due to the action of the spring $k$. The extremity of the pin $j$ is beveled, as shown at $j'$, and the adjustable gripping pin $h$ is located inward of the gripping pin $j$, in order that the saw tooth will be held in inclined position between the pins $h$, $j$, as shown in Fig. 2, and being thus in proper relation with respect to the anvil surface $d'$.

In order to determine the proper location of the tip of the saw tooth relatively to the length of the set to be given the point of the saw tooth, the head $b$ is provided with an adjustable gage plate $o$, fixed in place as adjusted by a set-screw $p$, threaded into the head $b$ through a slot $p'$ of the gate-plate $o$.

I claim:

1. In an instrument of the character described comprising a shank and a head made with two opposed jaws spaced apart, a projectable gripping pin in the lower jaw, a lever pivoted on the handle for projecting said gripping pin, a gripping pin in the upper jaw, the face of the lower jaw constituting an anvil and being shaped to the set to be given the point of the saw tooth, and a spring-controlled striker reciprocable in the head.

2. In an instrument of the character described comprising a shank and a head made with two opposed jaws spaced apart, a projectable gripping pin in the lower jaw, a spring normally holding such jaw retracted, a lever pivoted on the handle for projecting said gripping pin, a gripping pin in the upper jaw, the face of the lower jaw constituting an anvil and being shaped to the set to be given the point of the saw tooth, and a spring-controlled striker reciprocable in the head.

3. In an instrument of the character described comprising a shank and a head made with two opposed jaws spaced apart, a projectable gripping pin in the lower jaw, a lever pivoted on the handle for projecting said gripping pin, a gripping pin in the upper jaw, and the projectable gripping pin being located outward of the companion gripping pin.

4. In an instrument of the character described comprising a shank and a head made with two opposed jaws spaced apart, a projectable gripping pin in the lower jaw, the extremity of such gripping pin being beveled, a lever pivoted on the handle for projecting said gripping pin, a gripping pin in the upper jaw, and the projectable gripping pin being located outward of the companion gripping pin.

5. In an instrument of the character described comprising a shank and a head made with two opposed jaws spaced apart, a projectable gripping pin in the lower jaw, a spring normally holding such jaw retracted, a lever pivoted on the handle for projecting said gripping pin, a gripping pin in the upper jaw, the projectable gripping pin being located outward of the companion gripping pin, the face of the lower jaw constituting an anvil and being shaped to the set to be given the point of the saw tooth, a spring-controlled striker reciprocable in the head, and an adjustable gage in the space between adapted for positioning the saw tooth on the anvil relatively to the length of the set to be given the point of the saw tooth.

6. In an instrument of the character described comprising a shank and a head made with two opposed jaws spaced apart, a projectable gripping pin in the lower jaw, a lever pivoted on the handle for projecting said gripping pin, and an adjustable gripping pin in the upper jaw.

7. In an instrument of the character described comprising a shank and a head made with two opposed jaws spaced apart, a projectable gripping pin in the lower jaw, a lever pivoted on the handle for projecting said gripping pin, an adjustable gripping pin in the upper jaw, and means for locking such pin in place.

8. In an instrument of the character described comprising a shank and a head made with two opposed jaws spaced apart, a projectable gripping pin in the lower jaw, the extremity of such gripping pin being beveled, a lever pivoted on the handle for projecting said gripping pin, an adjustable gripping pin in the upper jaw, and the projectable gripping pin being located outward of the companion gripping pin.

9. In an instrument of the character described comprising a shank and a head made with two opposed jaws spaced apart, a projectable gripping pin in the lower jaw, a lever pivoted on the handle for projecting said gripping pin, a gripping pin in the upper jaw, the face of the lower jaw constituting an anvil and being shaped to the set to be given the point of the saw tooth, a spring-controlled striker reciprocable in the head, and an adjustable gage in the space between adapted for positioning the saw tooth on the anvil relatively to the length of the set to be given the point of the saw tooth.

10. In an instrument of the character described comprising a shank and a head made with two opposed jaws spaced apart, a projectable gripping pin in the lower jaw, a spring normally holding such jaw retracted, a lever pivoted on the handle for projecting said gripping pin, a gripping pin in the upper jaw, the projectable gripping pin being located outward of the companion gripping pin, the face of the lower jaw constituting an anvil and being shaped to the set to be given the point of the saw tooth, a spring-controlled striker reciprocable in the head, and an adjustable gage in the space between adapted for positioning the saw tooth on the anvil relatively to the length of the set to be given the point of the saw tooth.

11. In an instrument of the character described comprising a shank and a head made with two opposed jaws spaced apart, a projectable gripping pin in the lower jaw, the extremity of such gripping pin being beveled, a spring normally holding such pin retracted, a lever pivoted on the handle for projecting said gripping pin, an adjustable gripping pin in the upper jaw, the projectable gripping pin being located outward of the companion gripping pin, the face of the lower jaw constituting an anvil and being shaped to the set to be given the point of the saw tooth, a spring-controlled striker reciprocable in the head, the extremity of such striker being conformed to the face of said anvil face, and an adjustable gage in the space between adapted for positioning the saw tooth on the anvil relatively to the length of the set to be given the point of the saw tooth.

AUGUST H. BASTIAN.

Copies of this patent may be obtained for five cents each, by addressing the "Commissioner of Patents, Washington, D. C."